United States Patent [19]

Goldis

[11] Patent Number: 5,635,962
[45] Date of Patent: Jun. 3, 1997

[54] CAPACITIVE INK LEVEL DETECTION SENSOR

[75] Inventor: Yale N. Goldis, San Diego, Calif.

[73] Assignee: Hewlett-Packard Company, Palo Alto, Calif.

[21] Appl. No.: 505,989

[22] Filed: Jul. 24, 1995

[51] Int. Cl.⁶ .............................. B41J 2/195; B41J 2/175
[52] U.S. Cl. ................................... 347/7; 347/86
[58] Field of Search ................... 347/7, 85, 86, 347/87; 73/302

[56] References Cited

U.S. PATENT DOCUMENTS

| | | | |
|---|---|---|---|
| 4,415,886 | 11/1983 | Kyogoku et al. | 340/618 |
| 4,604,633 | 8/1986 | Kimura et al. | 346/140 R |
| 4,700,754 | 10/1987 | Kringe | 141/95 |
| 5,315,317 | 5/1994 | Terasawa et al. | 348/1.1 |

FOREIGN PATENT DOCUMENTS 57-187293   4/1984   Japan.

*Primary Examiner*—Safet Metjahic
*Assistant Examiner*—John Chizmar
*Attorney, Agent, or Firm*—Pamela Lau Kee

[57] ABSTRACT

A capacitive sensor for detecting the amount of residual ink remaining within an ink container of an ink jet cartridge by measuring the capacitance of the air dielectric between the ink bag and the ink cartridge.

8 Claims, 5 Drawing Sheets

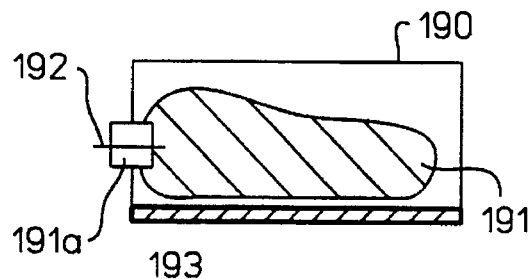
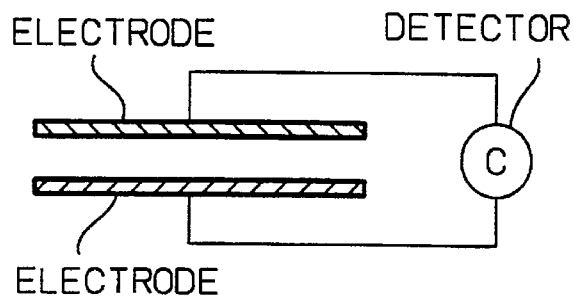
FIG. 2(a)　　　　　FIG. 2(a')
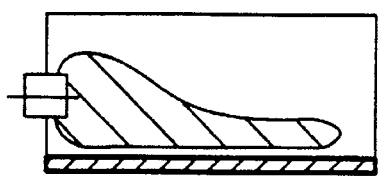
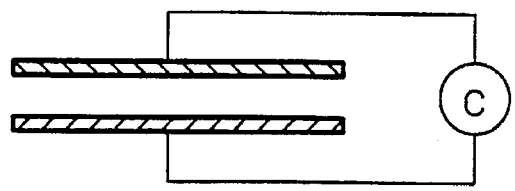
FIG. 2(b)　　　　　FIG. 2(b')
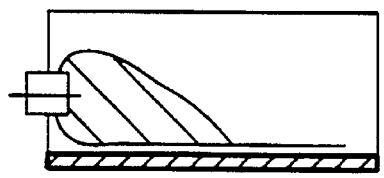
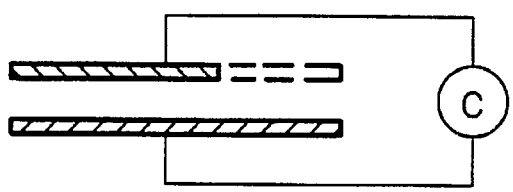
FIG. 2(c)　　　　　FIG. 2(c')
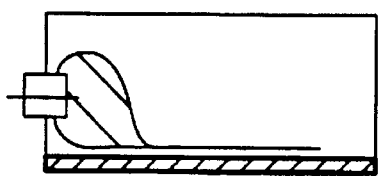
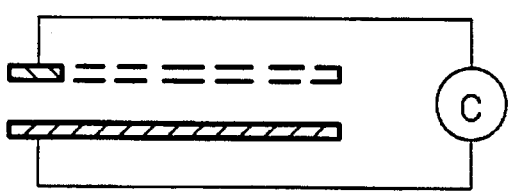
FIG. 2(d)　　　　　FIG. 2(d')
(PRIOR ART)

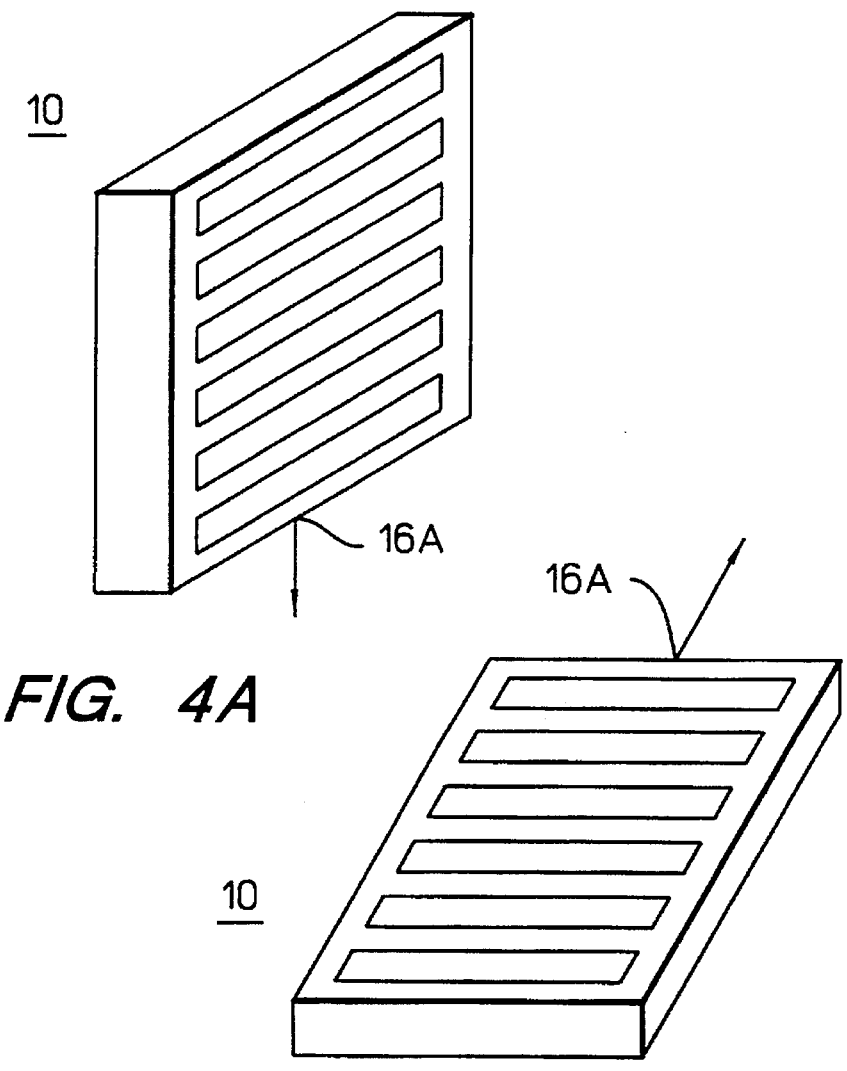
FIG. 4A
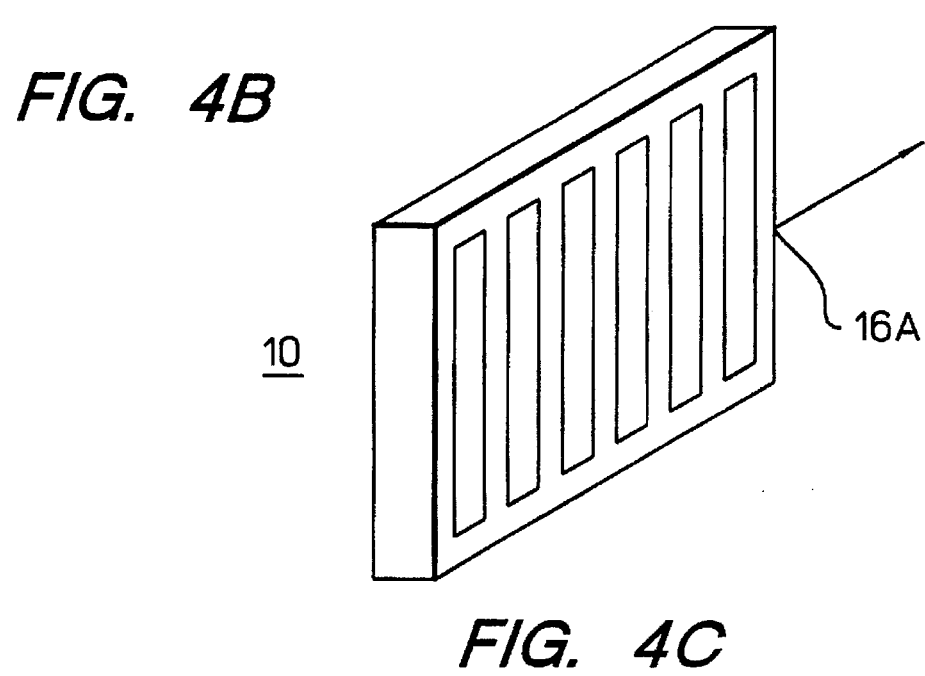
FIG. 4B
FIG. 4C

CAPACITIVE INK LEVEL DETECTION SENSOR

FIELD OF THE INVENTION

The present invention relates to an ink level detection sensor. More specifically, the present invention relates a capacitive sensor for detecting the amount of residual ink within an ink container of an ink jet cartridge.

BACKGROUND OF THE INVENTION

With conventional ink jet printers, drops of liquid ink are ejected onto a printer paper sheet for recording. An ink container for holding the ink must satisfy several requirements. The ink must not leak during vibrations or impacts in order not to contaminate the surrounding environment. The structure must substantially prevent evaporation of ink components to keep constant the physical characteristic of the ink, such as the surface tension and viscosity. An alarm must be generated for signaling the need for supplementing the ink when there is little ink left in the ink container. For ink jet printers where a voltage is applied as necessary to eject the ink, traditional residual ink detection mechanisms, such as magnetic floats or photosensitive detection, are not effective because the new ink containers are flat and thin. The measurement readings may be inaccurate because the magnetic float may appear stationary or the volume of the bag may not decrease with gravity. In a first prior art example, J.P.N. 57-187293, Tanaka measures the electrostatic capacity across an ink container as shown in FIG. 1. In a second prior art example shown in FIGS. 2(a)–(d'), U.S. Pat. No. 4,604,633, Kimura, et al. uses an electrostatic capacity detector to detect the displacement of a flexible bag with respect to a plate affixed to the bottom of a container. The bag acts as a second plate. Because capacitance depends on the area of the plates, the capacitance measurement decreases as the area of the ink bag near the bottom plate decreases. In the Kimura arrangement, the area of the second plate only goes down towards the end of life of the ink bag. In both cases, the presence of "low ink" is detected. While accurate, this is no comfort to the user having a time critical deadline to meet. If this user had been able to gauge the remaining ink, the need for a new ink container would have been anticipated.

SUMMARY OF THE INVENTION

A capacitive sensor for detecting the amount of residual ink remains within an ink bag of an ink jet cartridge by measuring the capacitance of the air dielectric between the ink bag and the ink cartridge. An ink bag is positioned between the pairs of electrical plates. An alternating electric field is applied across the ink bag. The capacitance from the ink bag to each plate is measured. The total capacitance measurement corresponds to the ink remaining in the ink bag. The sensor provides an accurate and continuous reading that reflects the ink remaining in a cartridge.

BRIEF DESCRIPTION OF THE DRAWINGS

FIGS. 2(a)–(d') illustrate another prior art example.

FIGS. 4A–4C show different preferred orientations for the capacitive sensor.

DETAILED DESCRIPTION OF THE PREFERRED EMBODIMENTS

Figure 1:
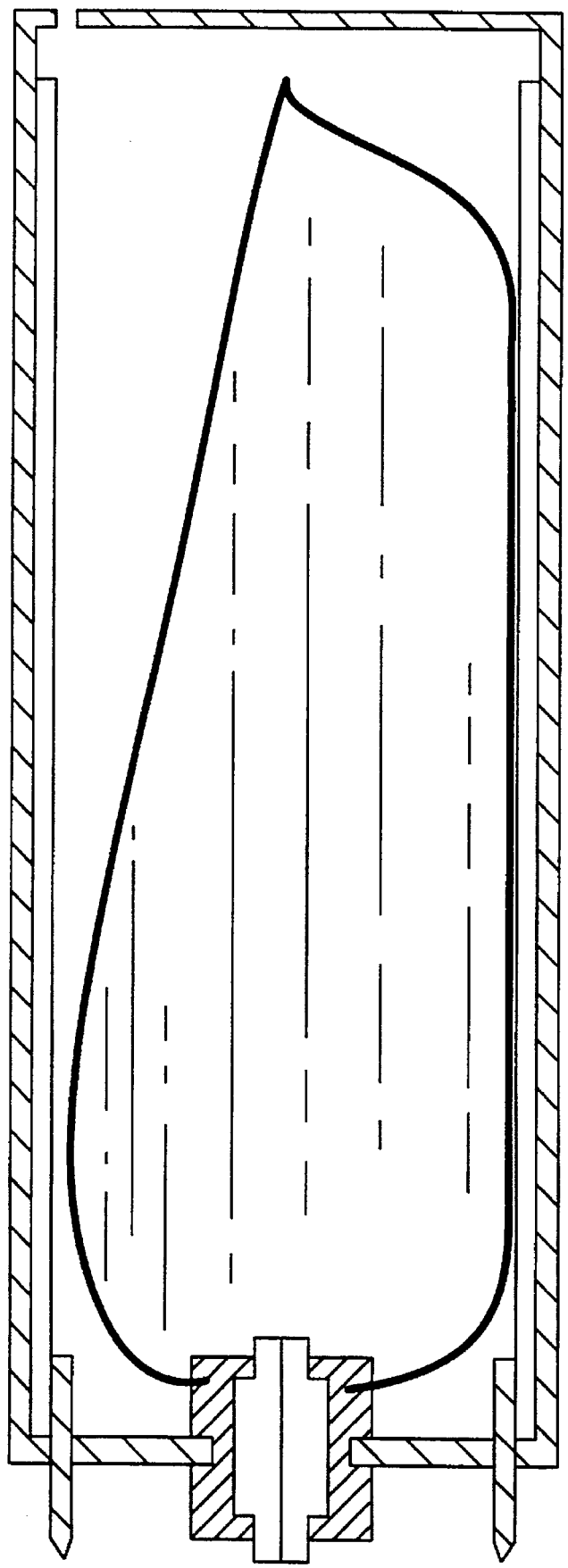
FIG. 1 illustrates a prior art example.
Figure 3:
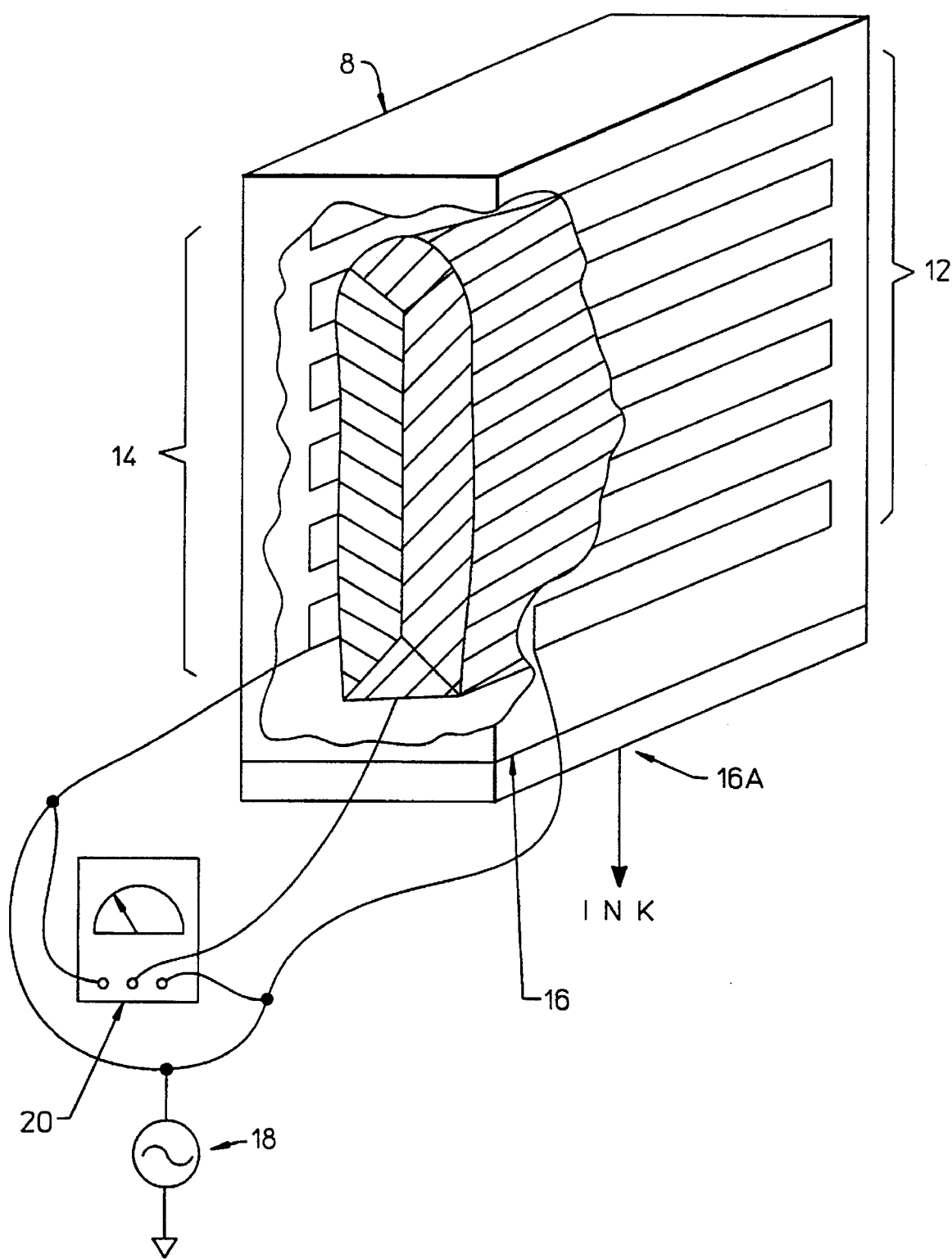
FIG. 3 illustrates an embodiment for a capacitive sensor.

FIG. 3 illustrates an embodiment for a capacitive sensor 10. On opposing sides of an ink cartridge 8, a first set of plates 12 is positioned parallel to a second set of plates 14. A bag 16 containing ink is positioned between the first and second set of plates 12, 14. The bag 16 has an exit 16A for the ink. An electrical source 18 is connected to the first and the second set of plates 12, 14. A capacitance meter 20 is connected to each one of the first set of plates 12, each one of the second set of plates 14, and the bag 16.

The electrical source 18 applies an alternating electric field to the first and the second set of plates 12, 14. The capacitance meter 20 measures the capacitance between the first set of plates 12 and the bag 16 and the capacitance between the second set of plates 14 and the bag 16. The capacitance measurements directly correspond to the ink remaining in the bag. Although the first and second set of plates 12, 14 are shown as multiple plates, each set of plates may be a continuous plate.

These capacitance measurements reflect the distance between the bag and the plates. The more ink, the closer the bag is to the plates and the higher the capacitance. The average distance of the bag to the plates is measured. If the bag leans to one side, then the capacitance on that side is stronger than the other. In this situation, the capacitance measurements can be averaged to determine the quantity of remaining ink. When the bag is in the middle, the both capacitance measurements will be approximately equal. When the ink bag is full, all of the plates are at their full capacitive value, As the ink drains, some plates are at their full values, while others are at lower values. This allows for additional readings beyond full and empty.

The capacitance measurement is determined as follows:

$$C = \frac{pA}{d} \tag{1}$$

p is the dielectric constant for air. A is the area of the plates while d is the distance between the plates and the ink bag. When the ink bag is full, d is small and the capacitance is high. As the ink bag empties, the ink bag pulls away the from the ink cartridge and d increases. The corresponding capacitance is low. The number of plates contained in each set determined by the desired sensitivity. Increasing the number of plates increases the sensitivity of the sensor up to a certain limit, at which the area of the plates dominates the capacitance compared to the distance FIGS. 4A–4C show different preferred orientations for the capacitive sensor. FIG. 4A illustrates a "toast" orientation. The ink exits through the bottom of the bag. The first and the second set of plates are oriented horizontally. FIG. 4B illustrates a "pancake" orientation. The ink exits through a side of the bag. The first set of plates is positioned over the second set of plates. FIG. 4C illustrates a "book" orientation. The first and the second set are oriented vertically. The ink exit through a side of the bag.

Figure 5:
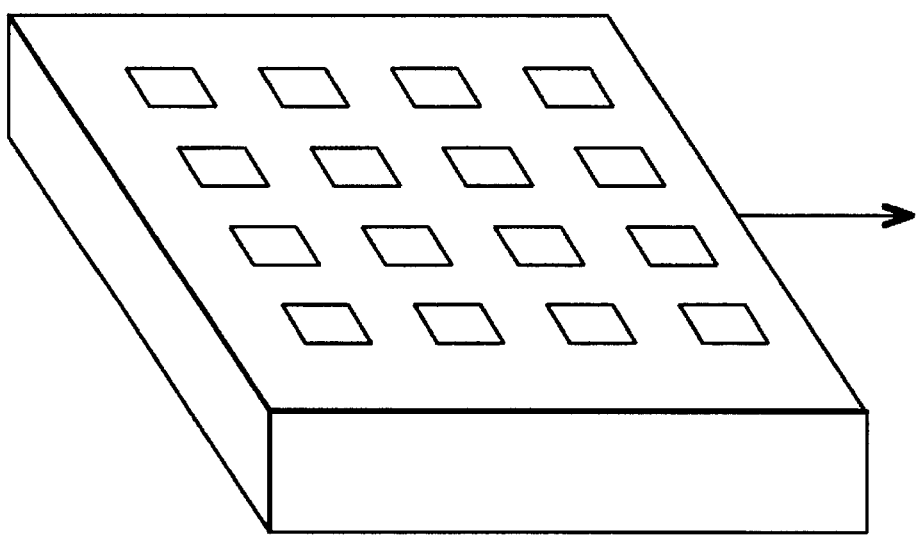
FIG. 5 illustrates an alternate embodiment for the capacitive sensor.

FIG. 5 illustrates an alternate embodiment. The set of plates is an array of little plates.

I claim:

1. A capacitive sensor for detecting the amount of residual ink, the capacitive sensor being operative to receive an alternating electric field, comprising:

an ink cartridge having two opposing interior walls;

two plates, wherein one of two plates is in contact with one of the two opposing interior walls and the other of the two plates is in contact with the other of the two opposing interior walls;

a bag containing ink, being positioned between the two plates, having an ink exit; and a capacitance meter, being connected to the two plates and the ink bag, being operated to determine a first capacitance measurement between one of the two plates and the bag and a second capacitance measurement between the other of the two plates and the bag, wherein a combination of the first and second capacitance measurements directly corresponds to the ink remaining in the bag.

2. A capacitive sensor, as defined in claim 1, wherein one of the two plates is a series of plate segments.

3. A capacitive sensor, as defined in claim 2, wherein the series of plate segments is positioned perpendicular to the direction that the ink exits.

4. A capacitive sensor, as defined in claim 1, wherein one of the two plates is an array of little plates.

5. A capacitive sensor for detecting the amount of residual ink, the capacitive sensor connecting to an electrical source and a capacitance meter for measuring a first and a second measurement, comprising:

an ink cartridge having two opposing interior walls;

two plates, one of two plates being in contact with one of the two opposing interior walls and being operative to connect to the capacitance meter, the other of the two plates being in contact with the other of the two opposing interior walls and being operative to connect to the capacitance meter; and a bag containing ink, being positioned between the two plates and being connected to the capacitance meter, having an ink exit;

wherein the first measurement is the capacitance between one of the two plates and the bag and the second measurement between the other of the two plates and the bag, wherein a combination of the first and second measurements directly corresponds to the ink remaining in the bag.

6. A capacitive sensor, as defined in claim 5, wherein one of the two plates is a series of plate segments.

7. A capacitive sensor, as defined in claim 6, wherein the series of plate segments is positioned perpendicular to the direction that the ink exits.

8. A capacitive sensor, as defined in claim 5, wherein one of the two plates is an array of little plates.

* * * * *